United States Patent
Ho

(10) Patent No.: US 11,003,989 B2
(45) Date of Patent: May 11, 2021

(54) NON-CONVEX OPTIMIZATION BY GRADIENT-ACCELERATED SIMULATED ANNEALING

(71) Applicant: Futurewei Technologies, Inc., Plano, TX (US)

(72) Inventor: Chiu Man Ho, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1050 days.

(21) Appl. No.: 15/499,737

(22) Filed: Apr. 27, 2017

(65) Prior Publication Data

US 2018/0314930 A1    Nov. 1, 2018

(51) Int. Cl.
*G06N 3/08* (2006.01)
*G06N 5/00* (2006.01)

(52) U.S. Cl.
CPC ............... *G06N 3/08* (2013.01); *G06N 5/003* (2013.01)

(58) Field of Classification Search
CPC ....................................................... G06N 3/08
USPC .......................................................... 706/19
See application file for complete search history.

(56) References Cited

U.S. PATENT DOCUMENTS

| 5,548,697 A * | 8/1996 | Zortea | H04N 9/646 |
| | | | 348/650 |
| 2014/0337263 A1* | 11/2014 | Zhu | H04W 4/38 |
| | | | 706/41 |

FOREIGN PATENT DOCUMENTS

| CN | 104866900 A | 8/2015 |
| CN | 105976051 A | 9/2016 |
| WO | WO-2017/058479 A1 | 4/2017 |

OTHER PUBLICATIONS

L.M. Rasdi Rere, "Simulated Annealing Algorithm for Deep Learning", 2015 (Year: 2015).*
Leon Bottou, "Stochastic Gradient Learning in Neural Networks", 1991 (Year: 1991).*
Peh et al ("Use of Artificial Neural Networks to Predict Drug Dissolution Profiles and Evaluation of Network Performance Using Similarity Factor" ) (Year: 2000).*
"International Application Serial No. PCT/CN2018/083749, International Search Report dated Jun. 28, 2018", 4 pgs.
"International Application Serial No. PCT/CN2018/083749, Written Opinion dated Jun. 28, 2018", 4 pgs.

* cited by examiner

*Primary Examiner* — Lut Wong
(74) *Attorney, Agent, or Firm* — Schwegman Lundberg & Woessner, P.A.

(57) ABSTRACT

A computer-implemented method of training a neural network comprises: identifying, by one or more processors, a set of parameters for a cost function for the neural network; applying, by the one or more processors, a gradient optimization of the cost function to generate a set of intermediate optimized parameter values for the cost function; initializing, by the one or more processors, a simulated annealing optimization of the cost function using the set of intermediate optimized parameter values for the cost function; applying, by the one or more processors, the simulated annealing optimization of the cost function to generate a set of final optimized parameter values for the cost function; assigning, by the one or more processors, the set of final optimized parameter values as weights for connections of the neural network; and using, by the one or more processors, the neural network to perform operations.

20 Claims, 9 Drawing Sheets

NON-CONVEX OPTIMIZATION BY GRADIENT-ACCELERATED SIMULATED ANNEALING

TECHNICAL FIELD

The present disclosure is related to training neural networks and, in one particular embodiment, to non-convex optimization by gradient-accelerated simulated annealing in training neural networks.

BACKGROUND

The cost function for neural networks may be non-convex. Gradient descent in non-convex cost functions may find a local minimum or a saddle point that is higher than the global cost minimum.

A cost function for a neural network is a measure of the quality of output of the neural network as a function of the parameters of the neural network. For example, a neural network used as a classifier may have a cost function that indicates the percentage of the input items that are incorrectly classified. In a non-convex cost function, there are multiple local minima, each of which may not be the global minimum. A saddle point is a point at which the derivative of the function is zero, but the point is not a local minimum.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, a computer-implemented method of training a neural network comprises: identifying, by one or more processors, a set of parameters for a cost function for the neural network; applying, by the one or more processors, a gradient optimization of the cost function to generate a set of intermediate optimized parameter values for the cost function; initializing, by the one or more processors, a simulated annealing optimization of the cost function using the set of intermediate optimized parameter values for the cost function; applying, by the one or more processors, the simulated annealing optimization of the cost function to generate a set of final optimized parameter values for the cost function; assigning, by the one or more processors, the set of final optimized parameter values as weights for connections of the neural network; and using, by the one or more processors, the neural network to perform operations.

Optionally, in any of the preceding aspects, the set of intermediate optimized parameter values for the cost function correspond to a local minimum or a saddle point of the cost function.

Optionally, in any of the preceding aspects, the set of final optimized parameter values for the cost function correspond to a global minimum of the cost function.

Optionally, in any of the preceding aspects, the applying of the gradient optimization of the cost function comprises iteratively defining, for each parameter of the set of parameters for the cost function, a value of the parameter for a next iteration that is the value of the parameter for a previous iteration added to a predefined factor multiplied by a derivative of the cost function with respect to the parameter.

Optionally, in any of the preceding aspects, the applying of the simulated annealing optimization of the cost function comprises iteratively defining, for each of the parameters of the set of parameters for the cost function, a value of the parameter for a next iteration that is the value of the parameter for a previous iteration added to a value that is randomized within a range.

Optionally, in any of the preceding aspects, the range is based on the value of the parameter in the previous iteration and a predefined factor.

Optionally, in any of the preceding aspects, the operations performed by the neural network comprise classifying images.

Optionally, in any of the preceding aspects, the operations performed by the neural network comprise function approximation.

Optionally, in any of the preceding aspects, the operations performed by the neural network comprise pattern recognition.

Optionally, in any of the preceding aspects, the operations performed by the neural network comprise regression analysis.

According to one aspect of the present disclosure, there is provided a device that comprises: a memory storage comprising instructions; one or more processors in communication with the memory storage, wherein the one or more processors execute the instructions to perform: identifying a set of parameters for a cost function for a neural network; applying a gradient optimization of the cost function to generate a set of intermediate optimized parameter values for the cost function; initializing a simulated annealing optimization of the cost function using the set of intermediate optimized parameter values for the cost function; and applying the simulated annealing optimization of the cost function to generate a set of final optimized parameter values for the cost function.

Optionally, in any of the preceding aspects, the set of intermediate optimized parameter values for the cost function correspond to a local minimum or a saddle point of the cost function.

Optionally, in any of the preceding aspects, the set of final optimized parameter values for the cost function correspond to a global minimum of the cost function.

Optionally, in any of the preceding aspects, the applying of the gradient optimization of the cost function comprises iteratively defining, for each of the parameters of the set of parameters for the cost function, a value of the parameter for a next iteration that is a value of the parameter for a previous iteration added to a predefined factor multiplied by a derivative of the cost function with respect to the parameter.

Optionally, in any of the preceding aspects, the applying of the simulated annealing optimization of the cost function comprises iteratively defining, for each of the parameters of the set of parameters for the cost function, a value of the parameter for a next iteration that is a value of the parameter for a previous iteration added to a value that is randomized within a range.

Optionally, in any of the preceding aspects, the range is based on the value of the parameter in the previous iteration and a predefined factor.

Optionally, in any of the preceding aspects, the operations performed by the neural network comprise classifying images.

Optionally, in any of the preceding aspects, the operations performed by the neural network comprise function approximation.

Optionally, in any of the preceding aspects, the operations performed by the neural network comprise pattern recognition.

According to one aspect of the present disclosure, there is provided a non-transitory computer-readable medium that stores computer instructions for training a neural network that, when executed by one or more processors, cause the one or more processors to perform steps of: identifying a set of parameters for a cost function for the neural network; applying a gradient optimization of the cost function to generate a set of intermediate optimized parameter values for the cost function; initializing a simulated annealing optimization of the cost function using the set of intermediate optimized parameter values for the cost function; and applying the simulated annealing optimization of the cost function to generate a set of final optimized parameter values for the cost function.

Any one of the foregoing examples may be combined with any one or more of the other foregoing examples to create a new embodiment within the scope of the present disclosure.

DETAILED DESCRIPTION

Figure 1:
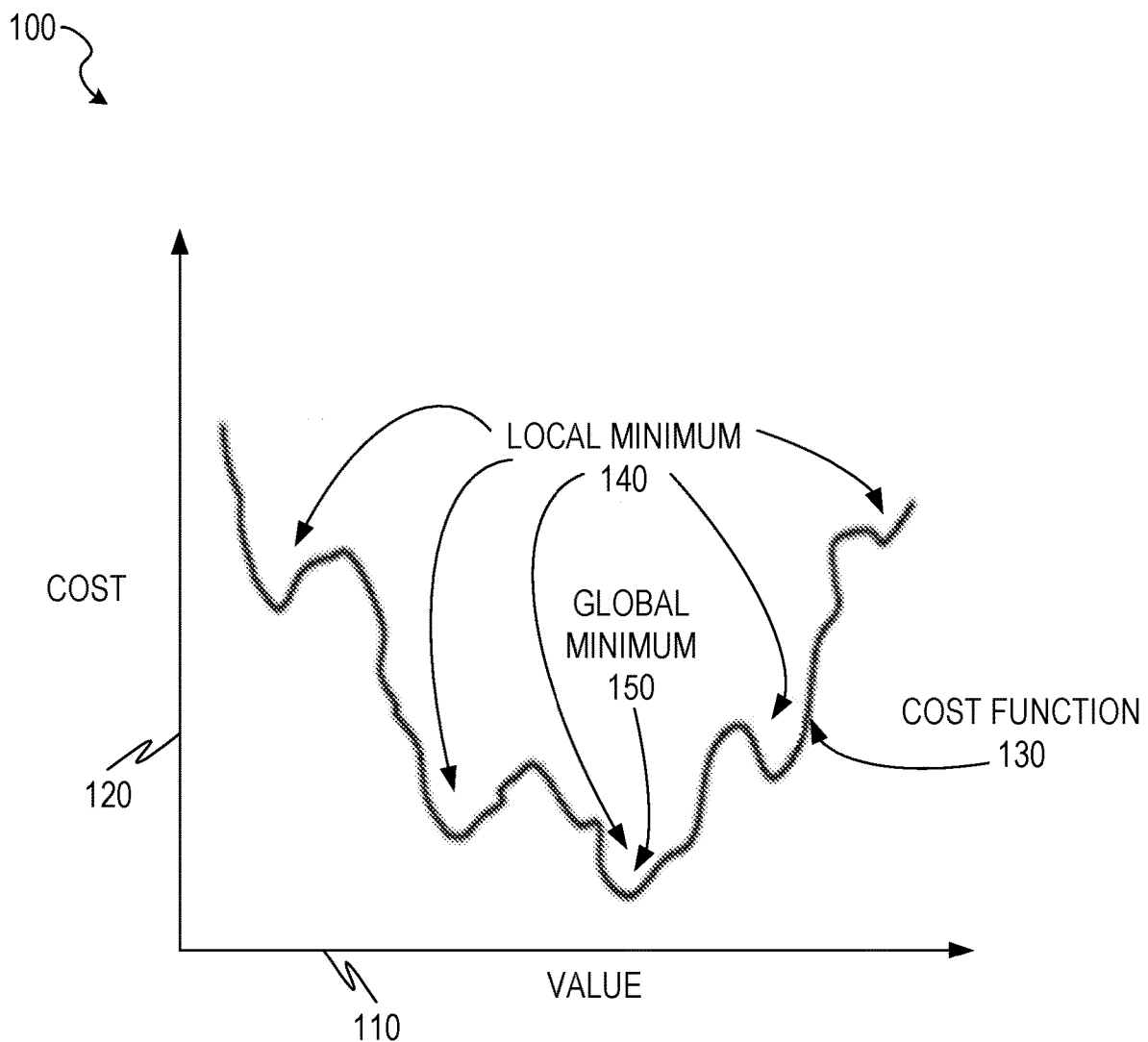
FIG. 1 is a two-dimensional graph showing a cost function for a variable, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure.

The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

In training neural networks and other deep learning techniques, a cost function for a set of variables is used. For example, in training a neural network to classify the contents of an image as a function of the attributes of the image, the output of the neural network is a class, the variables are the attributes of the image, and the cost function reflects an error rate of the classifier. Different sets of weights for the attributes will result in different results from the neural network and thus different values of the cost function. The goal of the training is to identify the set of weights for the neural network that has the lowest cost. The training process may be considered as an exploration of a solution space wherein the cost is a function of the location in the solution space defined by the particular set of values for the weights of the neural network. As used herein, a location in an optimization process refers to a particular set of values for the variables being optimized (e.g., the weights of a neural network).

In example embodiments, a minimum of the cost function is identified using gradient optimization. From a starting point (e.g., a starting set of weights), nearby locations are searched to identify a location that has a lower cost than the starting point. The lowest-cost nearby location is used as a new starting point, and the process is repeated until no further improvements are found. This method rapidly finds a local minimum (i.e., a location in the cost function where any small change to the values results in a higher cost) or a saddle point, but will not find a global minimum (i.e., a location in the cost function where the cost is less than or equal to the cost at every other location in the cost function) that is separated by higher-cost intermediate values. In a convex cost function, there is a single local minimum that is also the global minimum.

In example embodiments, a minimum of the cost function is identified using simulated annealing. From a starting point, values at a random selection of locations are searched to identify locations that have a lower cost. A large number of iterations are performed, greatly increasing the probability that the global minimum will be found. However, compared to gradient optimization, simulated annealing may be computationally expensive and time consuming.

As discussed herein, by using gradient optimization to generate intermediate optimized values and using those intermediate optimized values as the starting point for simulated annealing, results of the quality of standard simulated annealing are achieved with a reduced amount of computation.

FIG. 1 is a two-dimensional graph 100 showing a cost function 130 for a variable, according to some example embodiments. In the two-dimensional graph 100, the horizontal axis 110 is labeled "value" and the vertical axis 120 is labeled "cost." Thus, the cost function 130 is shown as a function of the value of the variable, with higher costs shown as being farther from the origin in the vertical direction. The cost function 130 is marked with local minima 140 and a global minimum 150 (which is also a local minimum 140). As can be seen in the two-dimensional graph 100, each local minimum 140 has a cost that is lower that the immediately adjacent costs. Thus, altering the value of the variable slightly from the value used for the local minimum 140 will result in a higher cost. The global minimum 150 has the lowest cost for the entire cost function 130.

Figure 2:
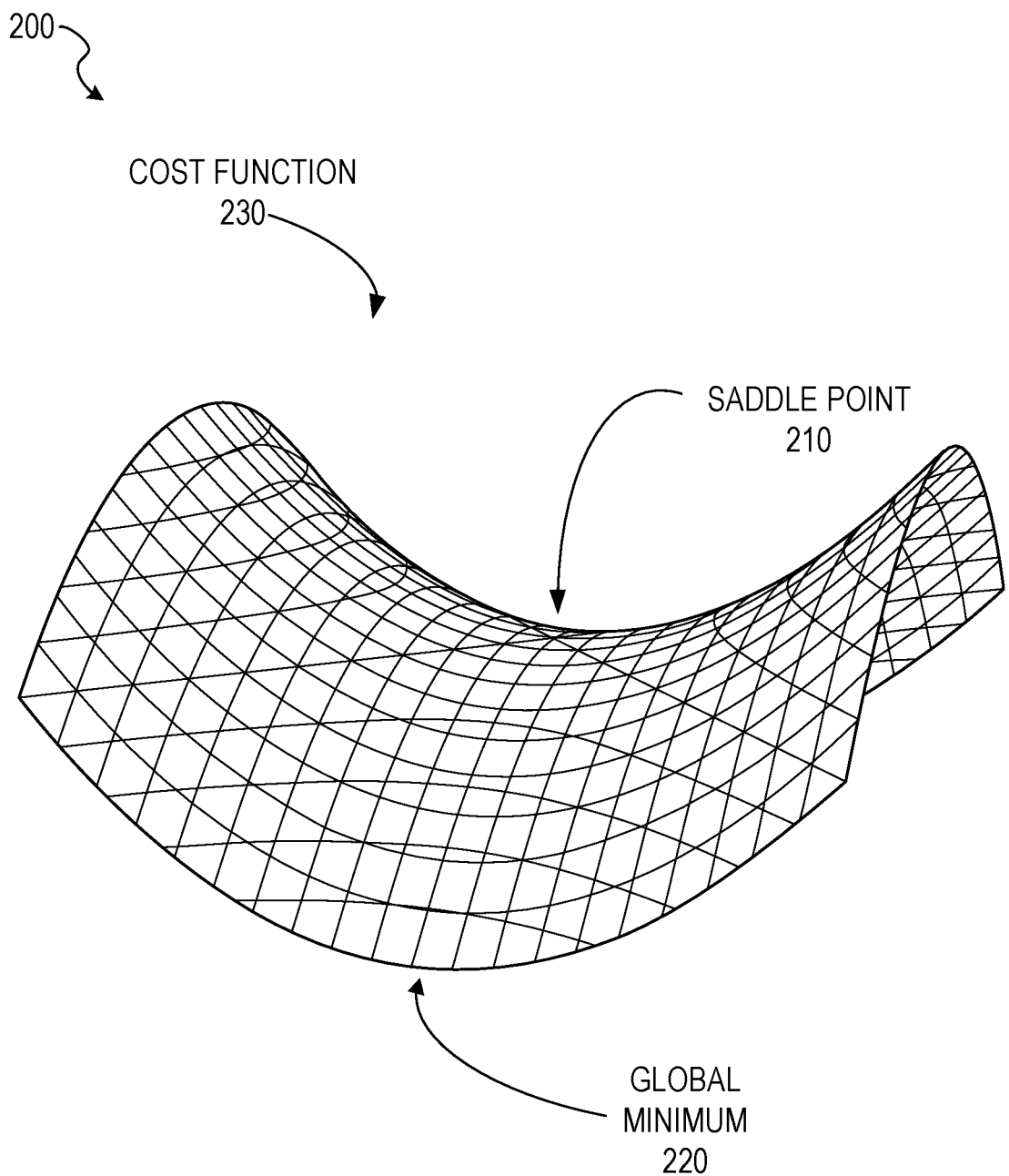
FIG. 2 is a three-dimensional graph showing a cost function for a set of variables, according to some example embodiments.

FIG. 2 is a three-dimensional graph 200 showing a cost function 230 for a set of variables, according to some example embodiments. The three-dimensional graph 200 shows the cost as a vertical offset from a two-dimensional plane, representing values of two variables. For clarity, only the one-variable example of FIG. 1 and the two-variable example of FIG. 2 are shown, but cost functions may be calculated for arbitrary numbers of variables. For example, in image recognition, dozens or hundreds of variables may be used. In the three-dimensional graph 200, the global minimum 220 corresponds to a particular set of values for the two variables and a saddle point 210 corresponds to another set of values for the two variables. In some implementations of gradient optimization for training neural networks, a saddle point is treated as a local minimum, causing the values for the saddle point to be used by the neural network instead of values resulting in a lower cost.

Figure 3:
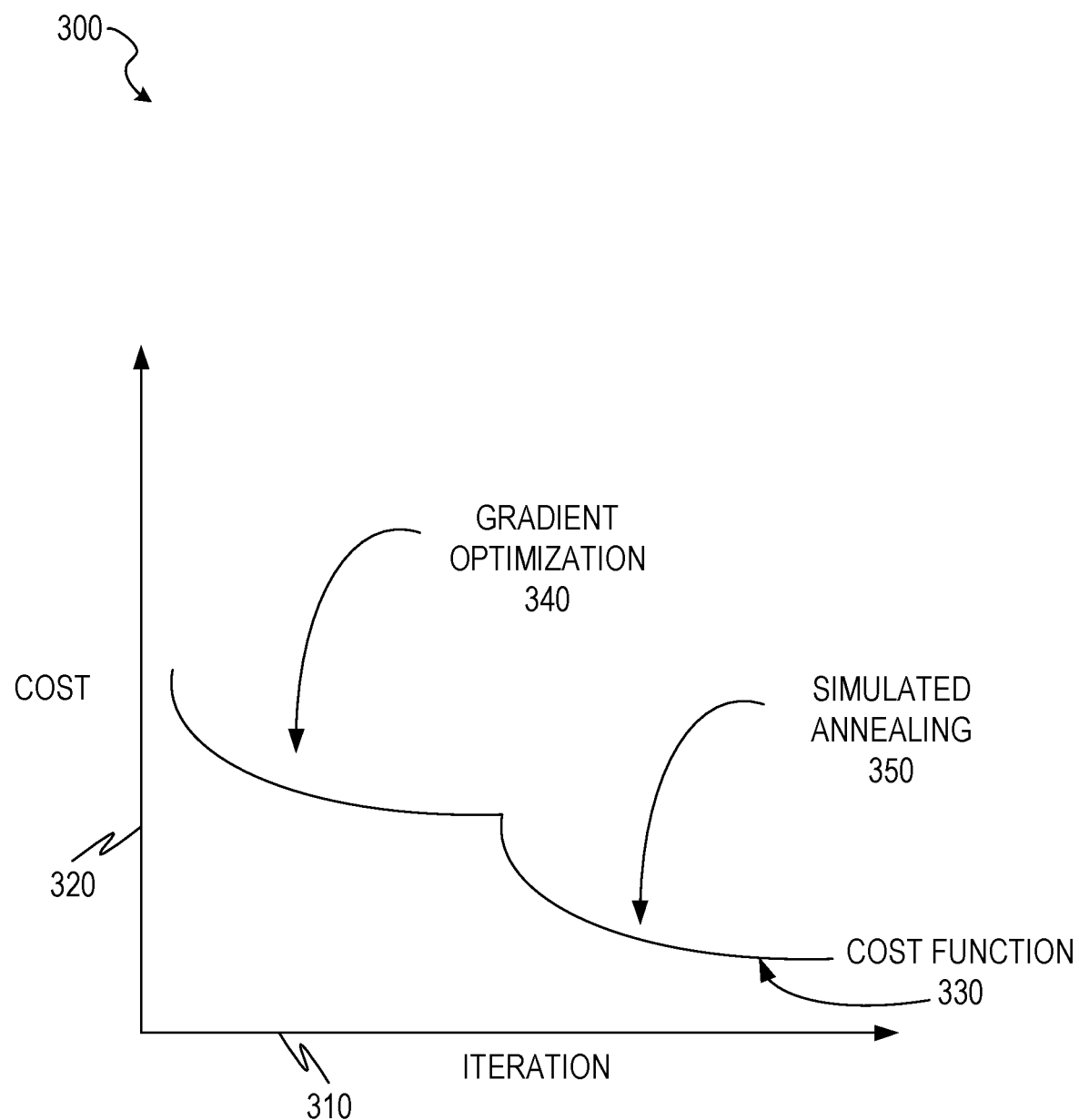
FIG. 3 is a graph showing a value of a cost function over a series of iterations using non-convex optimization by gradient-accelerated simulated annealing, according to some example embodiments.

FIG. 3 is a graph 300 showing a value of a cost function 330 over a series of iterations using non-convex optimization by gradient-accelerated simulated annealing, according to some example embodiments. In the graph 300, the horizontal axis 310 is labeled "iteration" and the vertical axis 320 is labeled "cost." Thus, the cost function 330 is shown as a function of the iteration, with higher costs shown as being farther from the origin in the vertical direction. The cost function 330 shows two smooth curves 340 and 350 connected by a non-differentiable point. The first curve 340 shows the effect of gradient optimization, which reduces the cost in each iteration but levels off as a local minimum or a saddle point is found. The second curve 350 shows the effect of simulated annealing. Because the set of values found by gradient optimization is used as the starting set of values for simulated annealing, the initial value of the cost function using simulated annealing is the same as the final value of the cost function of the gradient optimization. However, with additional iterations, simulated annealing is able to find the global minimum of the cost function, yielding a value of the cost function that is lower than the lowest value of the cost function found by gradient optimization alone. For example, the local minimum of the cost function found using gradient optimization may correspond to a 15% error rate and the lowest value of the cost function found using gradient-accelerated simulated annealing may correspond to a 5% error rate.

Figure 4:
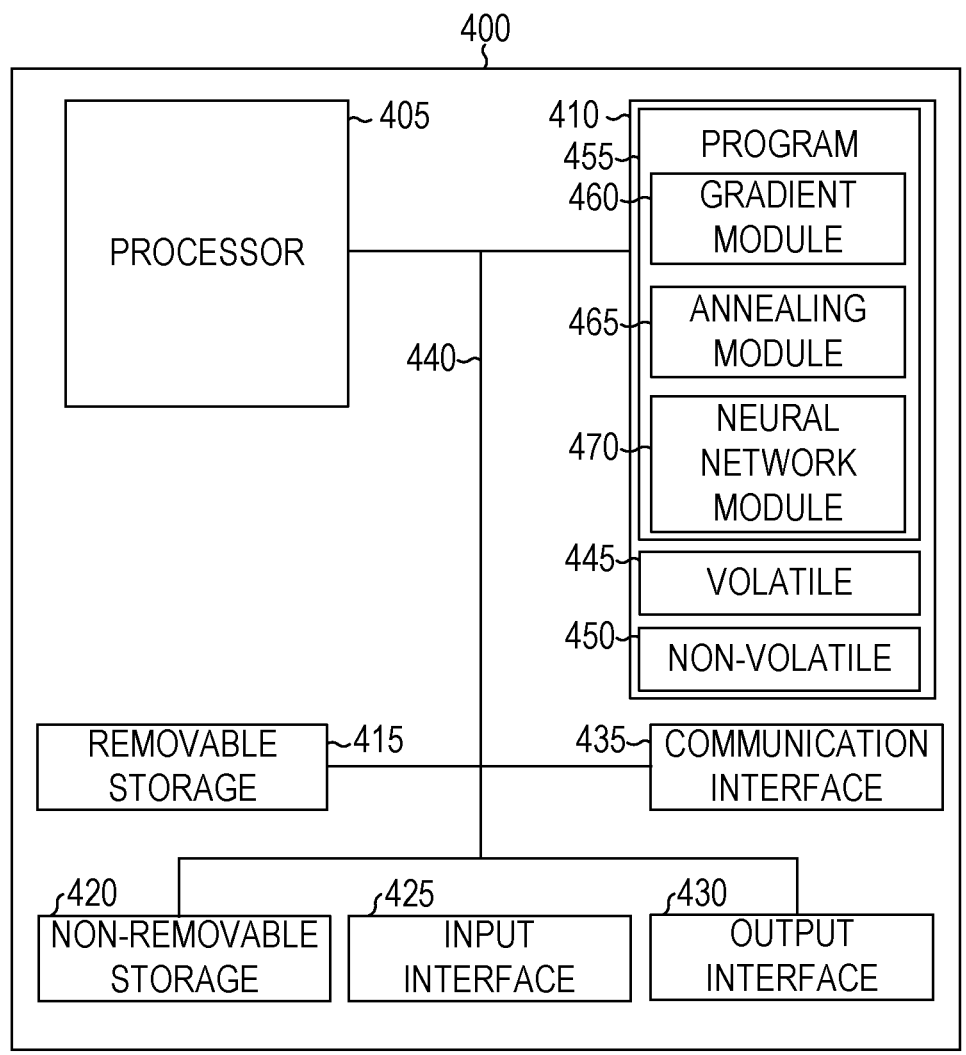
FIG. 4 a block diagram illustrating circuitry of a computer suitable for implementing algorithms and performing methods of non-convex optimization by gradient-accelerated simulated annealing, according to example embodiments.

FIG. 4 is a block diagram illustrating circuitry of a computer 400 suitable for implementing algorithms and performing methods of non-convex optimization by gradient-accelerated simulated annealing, according to example embodiments. All components need not be used in various embodiments. For example, a client, server, and cloud-based network resource may each use a different set of components, or in the case of servers for example, larger storage devices.

The computer 400 (also referred to as a computing device 400 and a computer system 400) may include a processor 405, memory storage 410, removable storage 415, non-removable storage 420, input interface 425, output interface 430, and communication interface 435, all connected by a bus 440. Although the example computing device is illustrated and described as the computer 400, the computing device may be in different forms in different embodiments. For example, the computing device may instead be a smartphone, a tablet, a smartwatch, or another computing device including elements the same as or similar to those illustrated and described with regard to FIG. 4. Devices, such as smartphones, tablets, and smartwatches, are generally collectively referred to as "mobile devices" or "user equipment." Further, although the various data storage elements are illustrated as part of the computer 400, the storage may also or alternatively include cloud-based storage accessible via a network, such as the Internet, or server-based storage.

The memory storage 410 may include volatile memory 445 and non-volatile memory 450, and may store a program 455. The computer 400 may include—or have access to a computing environment that includes—a variety of computer-readable media, such as the volatile memory 445, the non-volatile memory 450, the removable storage 415, and the non-removable storage 420. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

A computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The computer 400 may include or have access to a computing environment that includes the input interface 425, the output interface 430, and the communication interface 435. The output interface 430 may be an interface to a display device, such as a touchscreen, that also may serve as an input device. The input interface 425 may be an interface to one or more of a touchscreen, a touchpad, a mouse, a keyboard, a camera, one or more device-specific buttons, one or more sensors integrated within or coupled via wired or wireless data connections to the computer 400, and other input devices. The computer 400 may operate in a networked environment using the communication interface 435 to connect to one or more remote computers, such as database servers. The remote computer may include a personal computer (PC), server, router, network PC, peer device or other common network node, or the like. The communication interface 435 may include a local area network (LAN), a wide area network (WAN), a cellular network, a WiFi network, a Bluetooth network, or other networks.

Computer-readable instructions stored on a computer-readable medium (e.g., the program 455 stored in the memory storage 410) are executable by the processor 405 of the computer 400. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 455 is shown as including a gradient module 460, an annealing module 465, and a neural network module 470. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The gradient module 460 is configured to perform gradient optimization of a cost function. For example, the communication interface 435 may receive data defining a set of variables and the allowable ranges of values for each variable in the set along with a cost function. The gradient module 460 performs gradient optimization to generate a resulting set of values for the variables that corresponds to a local minimum or a saddle point in the cost function.

The annealing module 465 is configured to perform simulated annealing optimization of a cost function. For example, the gradient module 460 may provide a value for each variable in a set of variables to be used as a starting point for simulated annealing. The annealing module 465 performs simulated annealing to generate a resulting set of values for the variables that corresponds to a global minimum in the cost function.

The neural network module 470 is configured to train a neural network, use a neural network to perform operations, or both. Example tasks suitable for processing by neural networks include function approximation, regression analysis, image classification, pattern recognition, sequence recognition, novelty detection, sequential decision making, data filtering, data clustering, blind source separation, and compression.

Figure 5:
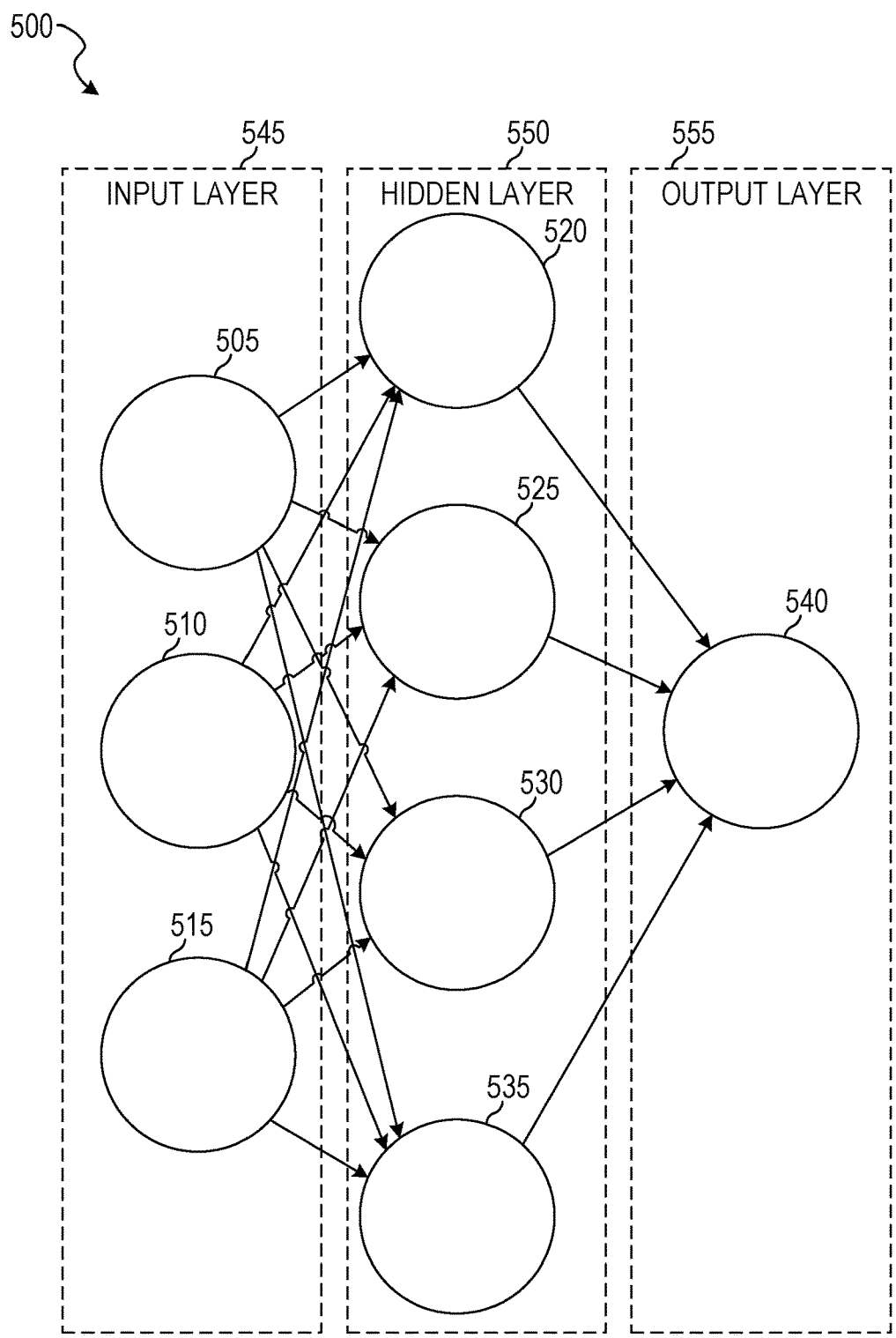
FIG. 5 is a block diagram illustration of a neural network suitable for non-convex optimization by gradient-accelerated simulated annealing, according to some example embodiments.

FIG. 5 is a block diagram illustration of a neural network 500 suitable for non-convex optimization by gradient-accelerated simulated annealing, according to some example embodiments. The neural network 500 includes nodes 505, 510, 515, 520, 525, 530, 535, and 540 organized into an input layer 545, a hidden layer 550, and an output layer 555. As can be seen in FIG. 5, the output of each node in each layer is connected as an input to each node of the subsequent layer. Thus, the output of each of the input layer nodes 505-515 is connected as an input to each of the hidden layer nodes 520-535, and the output of each of the hidden layer nodes 520-535 is connected as an input to the output layer node 540. The inputs to the neural network 500 are used as the values of the input layer nodes 505-515. The output of the neural network 500 is the value of the output layer node 540. In various example embodiments, more or fewer nodes are used in each layer, more or fewer hidden layers are used, or any suitable combination thereof.

The connections between pairs of nodes in a neural network are associated with weights. Training of the neural network involves determining the weight of each connection to minimize a cost function. The cost function may be measured as a distance between the output of the neural network (e.g., the value of the node 540) and a known correct output value. For the example neural network 500, with 16 inter-node connections, finding the optimized weights of the connections can be considered as a search of a sixteen-dimensional space, finding the location within the space that yields the lowest value of a cost function. Methods and systems disclosed herein may be used to train the neural network by gradient-accelerated simulated annealing. After training, the weights of the neural network are set, and the neural network can be set to its task.

Figure 6:
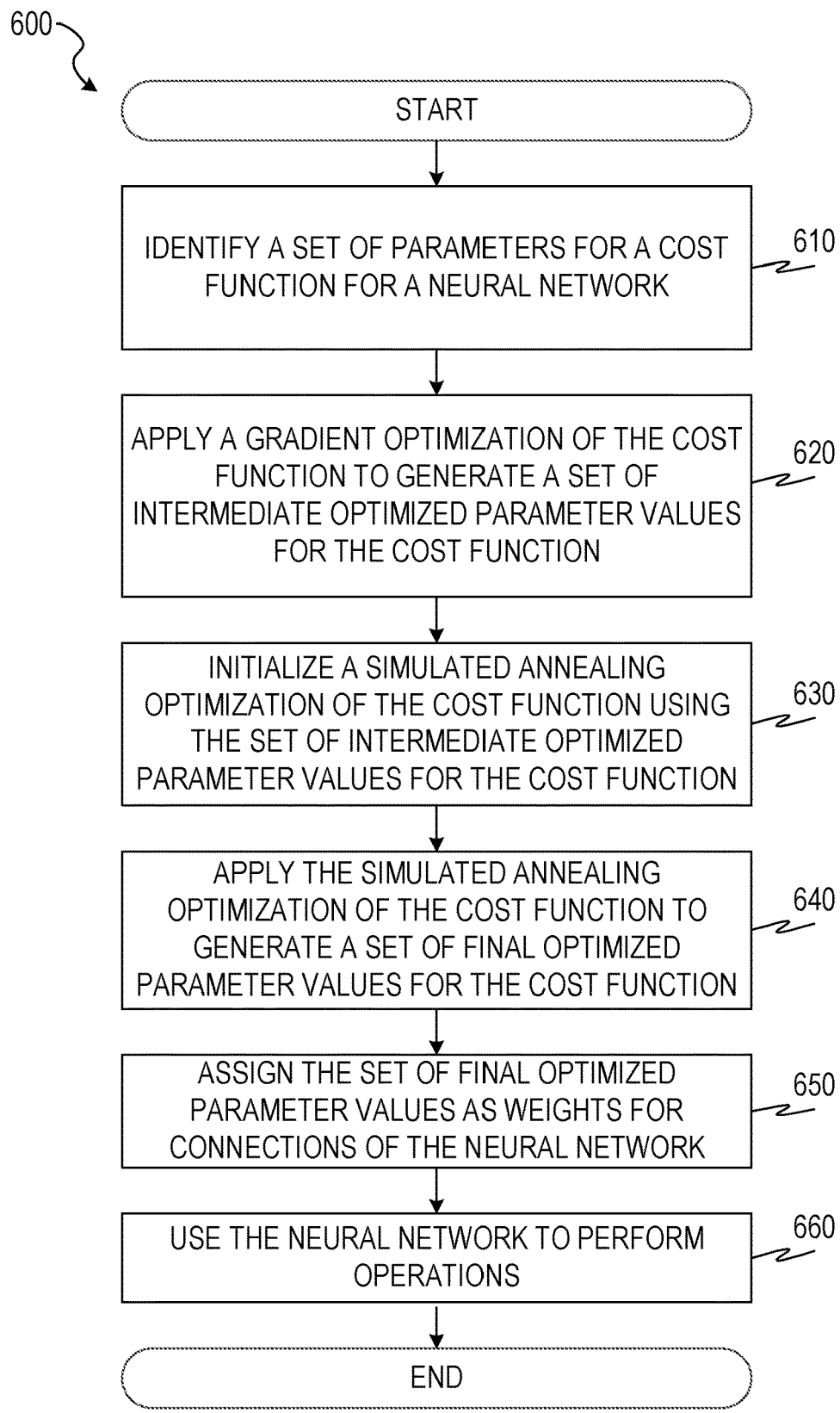
FIG. 6 is a flowchart illustration of a method of non-convex optimization by gradient-accelerated simulated annealing, according to some example embodiments.

FIG. 6 is a flowchart illustration of a method 600 of non-convex optimization by gradient-accelerated simulated annealing, according to some example embodiments. The method 600 includes operations 610, 620, 630, 640, 650, and 660. By way of example and not limitation, the method 600 is described as being performed by the computer 400 and its components.

In operation 610, the computer 400 identifies a set of parameters for a cost function for a neural network. For example, the set of parameters may be received by the communication interface 435 and stored in the volatile memory 445 by the program 455.

In operation 620, the gradient module 460 applies a gradient optimization of the cost function to generate a set of intermediate optimized parameter values for the cost function. For example, a gradient optimization algorithm may be iteratively applied from a random starting point until completion criteria are met. Example completion criteria include: no change in cost between iterations, reduction in cost between iterations falls below a predetermined threshold, number of iterations reaches a predetermined limit, or any suitable combination thereof.

In operation 630, the annealing module 465 initializes a simulated annealing optimization of the cost function using the set of intermediate optimized parameter values for the cost function. Thus, a process of simulated annealing will begin using the end result of the gradient optimization as the starting point.

In operation 640, the annealing module 465 applies the simulated annealing optimization of the cost function to generate a set of final optimized parameter values for the cost function. For example, a simulated annealing optimization algorithm may be iteratively applied until completion criteria are met.

In operation 650, the neural network module 470 assigns the set of final optimized parameter values as weights for connections of the neural network. In operation 660, the neural network module 470 uses the neural network to perform operations. For example, after the weights of the connections of the neural network have been determined using gradient-accelerated simulated annealing, the neural network may be used as an image classifier, for regression analysis, for pattern recognition, or for function approximation.

Figure 7:
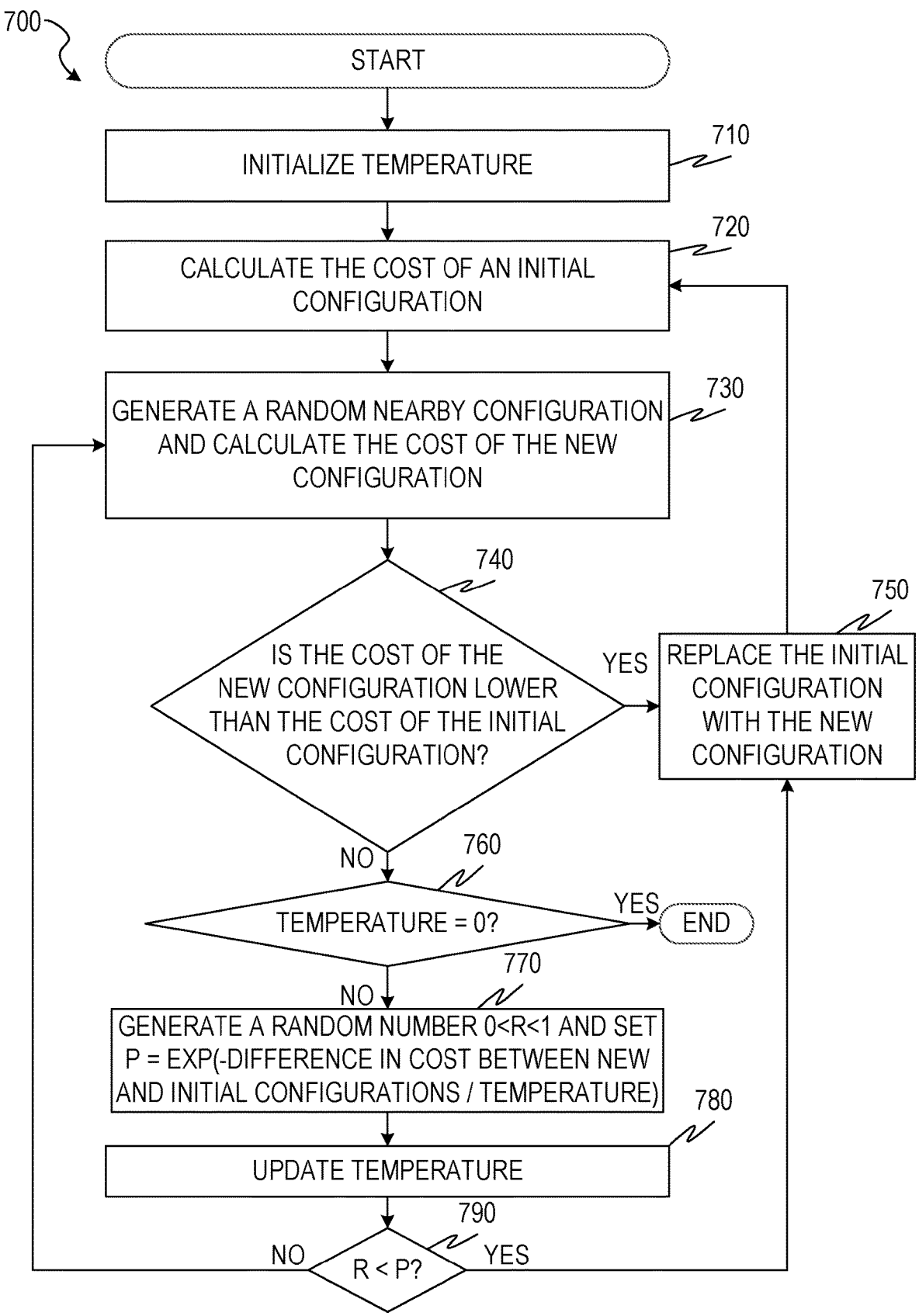
FIG. 7 is a flowchart illustration of a method of non-convex optimization by gradient-accelerated simulated annealing, according to some example embodiments.

FIG. 7 is a flowchart illustration of a method 700 of non-convex optimization by gradient-accelerated simulated annealing, according to some example embodiments. The method 700 includes operations 710, 720, 730, 740, 750, 760, 770, 780, and 790. By way of example and not limitation, the method 700 is described as being performed by the computer 400 and its components.

In operation 710, the annealing module 465 initializes a temperature value. The temperature begins at a high value and is decreased in each execution of operation 760 until it reaches zero and the method 700 terminates. A high temperature is one that causes most transitions generated in operation 730 to be accepted in operation 790. In some example embodiments, the initial temperature is selected such that the initial acceptance rate is 80%. In other example embodiments, a fixed starting temperature (e.g., 10 or 100) is used.

In operation 720, the annealing module 465 calculates the cost of an initial configuration. For example, the initial configuration may include a set of initial values for a set of corresponding variables. In some example embodiments, the initial configuration corresponds to a set of values generated by the gradient module 460.

In operation 730, the annealing module 465 generates a random nearby configuration and calculates the value of the cost function for the new configuration. For example, a random offset may be calculated and applied for each variable. The random offset may be selected within a predetermined range. For example, the random offset may be within 1% of the range of permissible values for the variable (e.g., if the variable has a range of 0-100, the random offset would be in the range of −1 to 1). Thus, each variable is modified by a random amount within a controlled range, resulting in a random configuration near to the initial configuration.

In operation 740, the annealing module 465 determines if the cost of the new configuration is lower than the cost of the initial configuration. If the cost of the new configuration is lower, the method 700 continues with operation 750. If not, the method 700 continues with operation 760.

In operation 750, the annealing module 465 replaces the initial configuration with the new configuration, and the method 700 returns to operation 720. Accordingly, so long as each new random nearby configuration generated in operation 730 has a lower cost than the previous configuration, operations 720-750 will repeat.

In operation 760, reached if the cost of the new configuration is higher than the cost of the initial configuration, the annealing module 465 checks the current temperature to see if it is equal to zero. If the temperature is equal to zero, the simulated annealing process is complete and the initial configuration is used as the result.

In operation 770, the annealing module 465 generates a random number between 0 and 1, and determines a value p. In some example embodiments, p is set equal to $e^{-E_f/k_B T}$, wherein $E_f$ is the difference between the cost of the new configuration and the cost of the initial configuration, $k_B$ is the Boltzmann constant, and T is the temperature. In some example embodiments, the Boltzmann constant is set to one, as shown in FIG. 7, simplifying the equation.

In operation 780, the annealing module 465 updates the temperature. For example, an exponential cooling schedule may be used, such that the updated temperature is 90% of the previous temperature. When the temperature falls below a predetermined threshold, the temperature is set to zero.

In operation 790, the generated random number is compared to the determined value p. If the random number is smaller than p, the method 700 continues with operation 750, replacing the initial configuration with the new configuration. If the random number is equal to or greater than p, the method 700 continues with operation 720, retaining the initial configuration.

Figure 8:
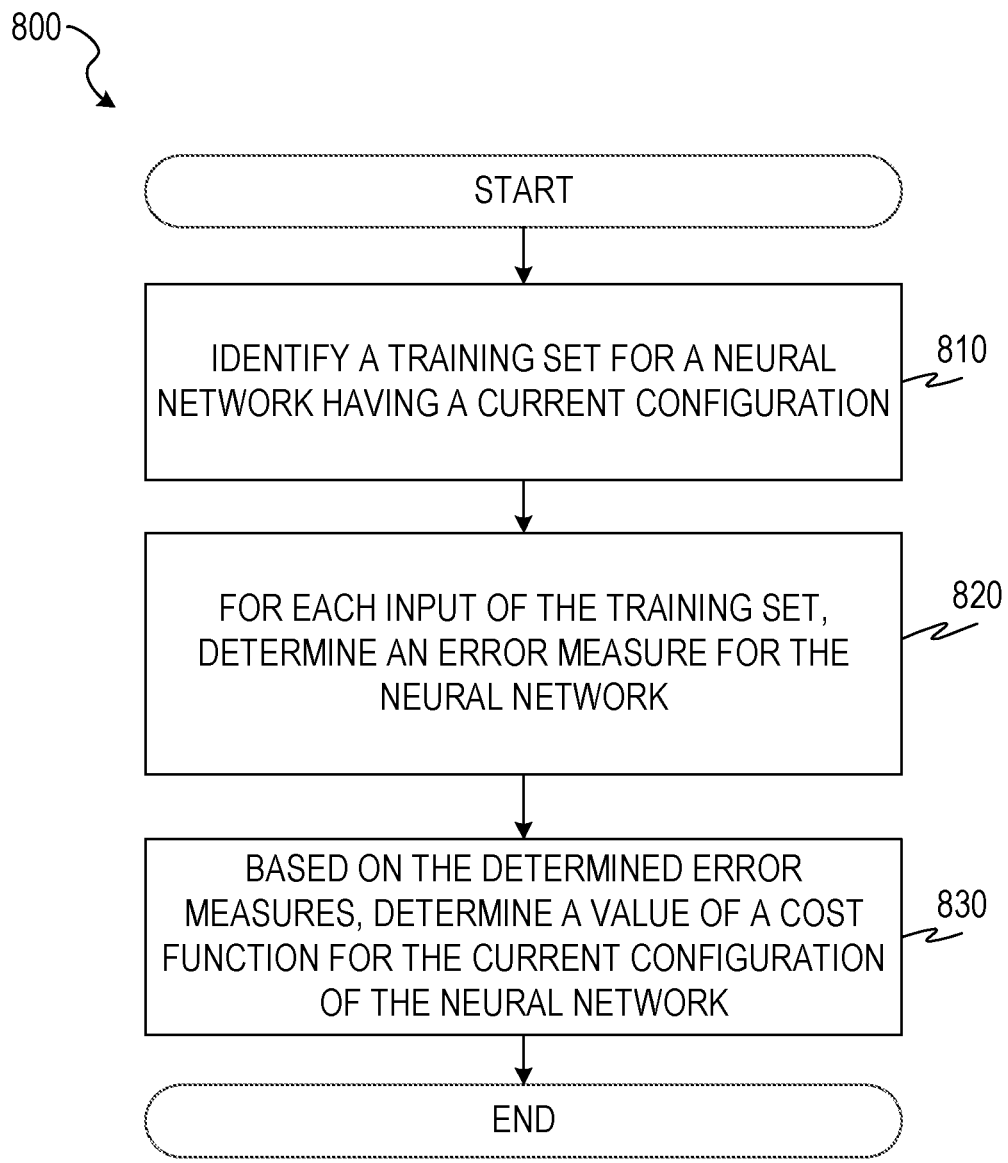
FIG. 8 is a flowchart illustration of a method of determining a value of a cost function for a configuration of a neural network, according to some example embodiments.

FIG. 8 is a flowchart illustration of a method of determining a value of a cost function for a configuration of a neural network, according to some example embodiments. The method 800 includes operations 810, 820, and 830. By way of example and not limitation, the method 800 is described as being performed by the computer 400 and its components. The method 800 may be invoked as part of operations 620, 640, 720, and 730, each of which determines one or more values of a cost function.

In operation 810, the neural network module 470 identifies a training set for a neural network having a current configuration. The current configuration may be a set of values of weights for connections between nodes, a structure of the neural network (e.g., number of nodes of each layer, number of layers, or any suitable combination thereof), or both. Each element of the training set comprises one or more input values for the neural network and a predetermined output for the one or more input values. For example, a training set for an image classifier may include a set of images and the corresponding class for each image. As another example, a training set for a neural network for function approximation or regression analysis may include a set of input values and the corresponding values of the function to be approximated or analyzed for each input value. As yet another example, a training set for a neural network for pattern recognition may include a set of input values and the corresponding pattern label for each input value.

In operation 820, the neural network module 470 determines an error measure for the neural network for each input of the training set. For example, the error measure for each input may be 0 if the output is correct and 1 if it is incorrect. As another example, the error measure may be an absolute value or square of the difference between the output of the neural network and the output defined by the training set. For example, if the input to a neural network is an image and the output is a numerical value representing the percentage of pixels corresponding to a color range defined as black (e.g., pixels having a sum of 8-bit red, green, and blue values below 64), the error measure may be based on the difference between the output of the neural network and the correct value. As another example, if the neural network is being used for function approximation or regression analysis, the error measure may be based on the difference between the output of the neural network and the correct value of the function being approximated or analyzed.

In operation 830, the neural network module 470 determines a value of a cost function for the current configuration of the neural network based on the determined error measures. For example, the error measure for each input of the training set may be summed.

Figure 9:
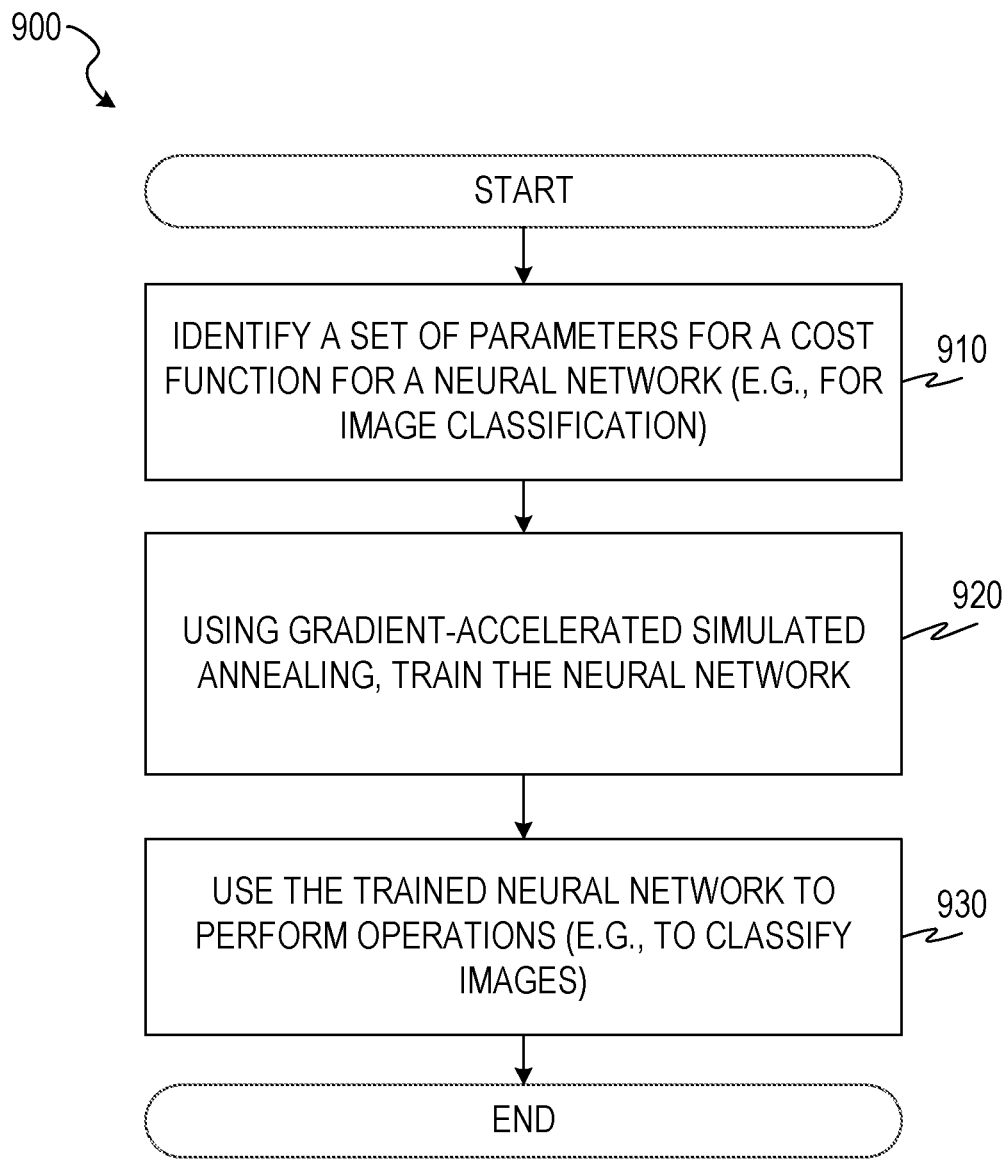
FIG. 9 is a flowchart illustration of a method of training a neural network with gradient-accelerated simulated annealing and using the trained neural network, according to some example embodiments.

FIG. 9 is a flowchart illustration of a method 900 of training a neural network with gradient-accelerated simulated annealing and using the trained neural network, according to some example embodiments. The method 900 includes operations 910, 920, and 930. By way of example and not limitation, the method 900 is described as being performed by the computer 400 and its components.

In operation 910, the neural network module 470 identifies a set of parameters for a cost function for a neural network. In some example embodiments, the neural network is an image classifier. The set of parameters may be the weights of connections between nodes of the neural network, as described above with respect to FIG. 5.

In operation 920, the neural network module 470 uses gradient-accelerated simulated annealing to train the neural network. For example, one or more of the methods 600 and 700 may be used to find values for the set of parameters that minimize the cost function.

In operation 930, the neural network module 470 uses the trained neural network to perform an operation. In example embodiments in which the neural network is an image classifier, the operation performed by the neural network comprises classifying images.

Example tasks suitable for processing by neural networks include function approximation, regression analysis, image classification, pattern recognition, sequence recognition, novelty detection, sequential decision making, data filtering, data clustering, blind source separation, and compression. For example, image classification may be used to perform optical character recognition (on an image of text) or medical diagnosis (on an image of skin, an x-ray image, a magnetic resonance imaging image, a retina scan, or any suitable combination thereof). Thus, any of these applications of neural networks may be improved by using neural networks trained using the methods disclosed herein.

Devices and methods disclosed herein may reduce time, processor cycles, and power consumed in optimizing configurations for neural networks. Devices and methods disclosed herein may also result in neural networks with greater accuracy than those trained by prior art methods, resulting in improved results when using the trained neural network.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of training a neural network comprising:
   identifying, by one or more processors, a set of parameters for a cost function for the neural network;
   applying, by the one or more processors, a gradient optimization of the cost function to generate a set of intermediate optimized parameter values for the cost function;
   initializing, by the one or more processors, a simulated annealing optimization of the cost function using the set of intermediate optimized parameter values for the cost function;
   applying, by the one or more processors, the simulated annealing optimization of the cost function to generate a set of final optimized parameter values for the cost function, the simulating annealing optimization comprising iteratively defining, for each parameter of the set of parameters for the cost function, a value of the parameter for a next iteration that is a value of the parameter for a previous iteration added to a value that is randomized within a one percent of a range of permissible values for the parameter;
   assigning, by the one or more processors, the set of final optimized parameter values as weights for connections of the neural network; and
   using, by the one or more processors, the neural network to perform operations.

2. The computer-implemented method of claim 1, wherein the set of intermediate optimized parameter values for the cost function correspond to a local minimum or a saddle point of the cost function.

3. The computer-implemented method of claim 1, wherein the set of final optimized parameter values for the cost function correspond to a global minimum of the cost function.

4. The computer-implemented method of claim 1, wherein the applying of the gradient optimization of the cost function comprises iteratively defining, for each parameter of the set of parameters for the cost function, a value of the parameter for a next gradient optimization iteration that is a value of the parameter for a previous gradient optimization iteration added to a predefined factor multiplied by a derivative of the cost function with respect to the parameter.

5. The computer-implemented method of claim 1, wherein the operations performed by the neural network comprise classifying images.

6. The computer-implemented method of claim 1, wherein the operations performed by the neural network comprise function approximation.

7. The computer-implemented method of claim 1, wherein the operations performed by the neural network comprise pattern recognition.

8. The computer-implemented method of claim 1, wherein the operations performed by the neural network comprise regression analysis.

9. A device comprising:
   a memory storage comprising instructions; and
   one or more processors in communication with the memory storage, wherein the one or more processors execute the instructions to perform:
      identifying a set of parameters for a cost function for a neural network;
      applying a gradient optimization of the cost function to generate a set of intermediate optimized parameter values for the cost function;
      initializing a simulated annealing optimization of the cost function using the set of intermediate optimized parameter values for the cost function;
      applying the simulated annealing optimization of the cost function to generate a set of final optimized parameter values for the cost function, the simulating annealing optimization comprising iteratively defining, for each parameter of the set of parameters for the cost function, a value of the parameter for a next iteration that is a value of the parameter for a previous iteration added to a value that is randomized within a one percent of a range of permissible values for the parameter;
      assigning the set of final optimized parameter values as weights for connections of the neural network; and
      using the neural network to perform operations.

10. The device of claim 9, wherein the set of intermediate optimized parameter values for the cost function correspond to a local minimum or a saddle point of the cost function.

11. The device of claim 9, wherein the set of final optimized parameter values for the cost function correspond to a global minimum of the cost function.

12. The device of claim 9, wherein the applying of the gradient optimization of the cost function comprises iteratively defining, for each parameter of the set of parameters for the cost function, a value of the parameter for a next gradient optimization iteration that is a value of the parameter for a previous gradient optimization iteration added to a predefined factor multiplied by a derivative of the cost function with respect to the parameter.

13. The device of claim 9, wherein the operations performed by the neural network comprise classifying images.

14. The device of claim 9, wherein the operations performed by the neural network comprise function approximation.

15. The device of claim 9, wherein the operations performed by the neural network comprise pattern recognition.

16. A non-transitory computer-readable medium storing computer instructions for training a neural network, that when executed by one or more processors, cause the one or more processors to perform steps of:

identifying a set of parameters for a cost function for the neural network;

applying a gradient optimization of the cost function to generate a set of intermediate optimized parameter values for the cost function;

initializing a simulated annealing optimization of the cost function using the set of intermediate optimized parameter values for the cost function;

applying the simulated annealing optimization of the cost function to generate a set of final optimized parameter values for the cost function, the simulating annealing optimization comprising iteratively defining, for each parameter of the set of parameters for the cost function, a value of the parameter for a next iteration that is a value of the parameter for a previous iteration added to a value that is randomized within a one percent of a range of permissible values for the parameter;

assigning the set of final optimized parameter values as weights for connections of the neural network; and using the neural network to perform operations.

17. The non-transitory computer-readable medium of claim 16, wherein the set of intermediate optimized parameter values for the cost function correspond to a local minimum or a saddle point of the cost function.

18. The non-transitory computer-readable medium of claim 16, wherein the set of final optimized parameter values for the cost function correspond to a global minimum of the cost function.

19. The non-transitory computer-readable medium of claim 16, wherein the applying of the gradient optimization of the cost function comprises iteratively defining, for each parameter of the set of parameters for the cost function, a value of the parameter for a next gradient optimization iteration that is a value of the parameter for a previous gradient optimization iteration added to a predefined factor multiplied by a derivative of the cost function with respect to the parameter.

20. The non-transitory computer-readable medium of claim 16, wherein the operations performed by the neural network comprise classifying images.

* * * * *